Patented Apr. 5, 1949

2,466,047

UNITED STATES PATENT OFFICE 2,466,047

PREPARATION OF CLAY CATALYSTS

Hubert A. Shabaker, Media, and George Alexander Mills, Ridley Park, Pa., and Ruth C. Denison, Wilmington, Del., assignors to Houdry Process Corporation, Wilmington, Del., a corporation of Delaware No Drawing. Application January 30, 1946, Serial No. 644,422

10 Claims. (Cl. 252—450)

1

The present invention relates to argillaceous contact masses and is particularly concerned with products derived from montmorillonite clays having new and improved properties especially important in contact catalysis and methods for the preparation of the same.

It has heretofore been proposed to employ as contact masses in catalytic conversion of hydrocarbons certain natural earths and clays. Very few of such materials that have been tried in cracking, reforming or related reactions have been found appropriate for the purpose, since in many instances catalysts formed therefrom were found to be substantially inert, or had a tendency to promote excessive deposition of coky substance which is not only undesirable on its own account, but such deposit also effects rapid decline in catalytic activity, necessitating frequent regeneration after comparatively short periods of operation.

The value of a contact material as a catalyst in the processes referred to is dependent upon its capability of selectively forming from the charge stock optimum quantities of desired liquid hydrocarbons such as products useful as motor fuel, with a minimum production of gas and coke. For instance a contact material which is relatively inert catalytically, such as diatomaceous earth or kieselguhr, when attempted to be used in a cracking operation, yields products varying but little in quality and quantity from those obtained by thermal cracking in the absence of such contact material. On the other hand, there are contact materials of natural or synthetic origin which have the property of forming from petroleum hydrocarbon fractions large quantities of carbon and low molecular weight gases including hydrocarbon gases, at the expense of desired liquid fractions. Such contact materials likewise are not ordinarily useful or desirable as cracking or reforming catalysts.

Among the natural adsorptive materials which are either substantially inert or otherwise impractical as hydrocarbon conversion catalysts because they produce large quantities of coke and/or gas compared to the gasoline yield, there are some clays including certain sub-bentonites which can be activated by acid treatment, to produce catalysts of acceptable quality. Many available clays, including others of the montmorillonite type, which do not respond to the usual methods of activation to produce catalysts of desired selectivity and sufficiently high activity levels are regarded as unsuitable for practical use as cracking or reforming catalysts.

The present invention has among its objects the provision of special methods of improving clays of the montmorillonite type, whereby catalysts of advantageous properties particularly

2 useful in hydrocarbon conversion are obtained. Similar treatments directed to clays in general and particularly to kaolin clays are described and claimed in our copending application Serial No. 644,421 filed of even date herewith.

Naturally occurring clays are composed chiefly of hydrosilicates of aluminum but ordinarily contain besides the principal compounds and complexes of silica and alumina lesser proportions of compounds of iron, calcium, magnesium, etc. Some clays also include among their lesser components, compounds of zirconium or titanium. In the selection of natural absorptive materials for use as catalysts it has previously been observed in U. S. Patent 2,078,945 of Eugene J. Houdry, that the content of iron as ferric oxide has a critical relation to the capacity of the contact mass for regeneration without extensive loss in catalytic activity. The patent indicates that contact masses suitable for use as catalysts should not contain over 3% of iron oxide.

Although a large part of the iron compounds occurring in or as components of clay are present in such form that they can be readily removed therefrom as for instance by conventional acid treatment, such procedures result as in prior art activatable bentonite type clay catalysts, in products still containing in the order of about 1.5% or more of iron determined as ferric oxide. Acid treatment also removes portions of the aluminum content of the clay so that if the clay residue is to be used for purposes where aluminum content is an important consideration, as for catalyst manufacture, the extent of the treatment must accordingly be limited. Thus on repeated or more drastic treatments, additional quantities of iron compounds may be removed but accompanied by impaired physical properties and because of additional extraction of comparatively large quantities of aluminum compound the treatment provokes a marked decline in catalytic activity, eventually resulting in products of such reduced catalytic activity that they are no longer useful for the purpose. Although it is not desired to be bound by any scientific explanation, there is reason to believe that the less readily removable iron components of argilloferruginous clays are present in a different form from that of the more easily extractable iron components, being intimately associated in a complex with silicon or perhaps forming a part of the lattice structure by addition to or as proxy for other principal cations of the pattern. This form of iron component may be broadly designated as "isomorphous," although it is recognized that the clay structure may not necessarily be crystalline and that a portion or all of the more tenaciously held iron components may vary in form from that of the principal components of the clay structure.

In accordance with the present invention clays of the montmorillonite group generally and including acid-activated bentonites are treated at elevated temperature with a gas or vapor of selected characteristics. As a result of the treatment certain properties of the clay are modified consequent to or coincident with the reaction between the gas or vapor employed and the iron compounds present in the clay, the gas or vapor being so selected as to provide a component reactive with the iron to form iron salts. The iron compounds present in the clay including such residual iron compounds as are not removed or removable by conventional acid activation, and which are apparently present as silicon complexes or otherwise intimately associated with the lattice structure as in isomorphous form, as above explained, are released by their transformation to simple iron products which can be readily removed by mild acid treatment and/or washing, and in some instances by volatilization.

The products obtained in accordance with the invention are characterized by important differences in physical properties that cannot be attributed entirely to the reduced iron content and accordingly certain structural changes are believed to have taken place as a result of the novel treatment of the clay as hereinafter described. For instance, the new products no longer shrink substantially at calcination temperatures of 1600° F., withstand high temperatures without substantial depreciation in catalytic activity, and demonstrate characteristic differences in X-ray pattern. Besides, the new products show a distinct difference in color being generally whiter or lighter than the clays from which they are prepared and notable differences in spectrogram are also observed. Catalysts prepared from clays treated in accordance with the present invention obtain not only unexpectedly low initial coke makes on heavy and sulfur stocks, but demonstrate a surprising resistance to "abnormal aging" and deterioration by highly corrosive charge stocks, on continued use. Desirable product distribution and excellent weight ratios of gasoline/coke and gasoline/gas on lighter charge stocks may be also obtained. The present catalysts are capable of withstanding more severe conditions and higher regeneration temperatures in practical operation which considered together with an indicated longer "useful life" of the catalyst and efficient yields of desired cracked products, total up to important economic advantages in the improved processes of hydrocarbon conversion. Moreover, by the use of the novel catalysts it is now made possible to operate more efficiently and economically with sulfur-containing and other corrosive stocks which rapidly deteriorate ordinary clay catalysts.

Unless the clay is already acid-activated the treatment with the gas or vapor at elevated temperature above described is preferably preceded as well as followed by a wet treatment with mineral acid or an organic acid which forms soluble iron salts or complexes, including lower aliphatic carboxylic acids such as oxalic and acetic as well as hydroxy acids including lactic and the so called sugar acids. By the preliminary acid treatment or conventional acid activation the more available iron compounds (f. i., outside of the lattice structure) are converted to soluble iron salts which are removed as in the known acid activation of sub-bentonites and the residual iron component (f. i., chemically combined in the lattice) thereafter can be acted upon by the gaseous treating agents, with greater facility in view of the improved porosity of the clay. Acid treatment following the dry gaseous treatment is effective in removing or assisting in the removal of products formed by the reaction of the gaseous agents with the complex or otherwise non-removable residual iron components. It will be readily understood, therefore, that it is advantageous to employ an acid treatment both before and after the gas or vapor treatment at elevated temperature.

The acid pre-treatment may be effected by but is not restricted to known processes such as are employed in the art for "acid activation" in the manufacture of decolorizing clays. For instance, the acid treatment may be carried out on the clay in finely divided form while the clay is suspended in water as in the nature of a slurry, to which concentrated mineral acid such as hydrochloric or sulfuric is added, or dilute mineral acid may be added directly to the finely divided clay. In either case the weight ratio of acid to dry clay, as in known activation, may be from about 20 to 100% (anhydrous basis) but is preferably in the order of 30 to 40%. The mixture of clay and acid is preferably heated to about 160° to 210° F. for a period of two to twelve hours, thereafter water washed and filtered. If desired, the clay may at this point be washed free of acid ions with accompanying extraction of substantially all soluble metal salts. The acid treated clay with or without purification by washing may then be dried in any known or desired manner. More concentrated or larger proportions of acid may be employed and/or higher temperatures including increased pressures, or longer periods of treatment up to the approximate limit where the combined effect tends to no longer selectively remove iron compounds without undue solution of aluminum compounds. This point cannot always be defined accurately with respect to chemical composition of the acid treated clay, for the optimum point varies with the source of the raw bentonites. For many if not most raw bentonites, however, this point is reached when the weight ratio of $SiO_2$ to $Al_2O_3$ of the treated clay lies in the range of 2.5:1 to 10:1 and the residual alumina content is in the range of about 25 to 5%. It is preferred, however, to employ less drastic acid treatments short of the designated limit. Acid treatments of clay such as for instance are described in U. S. Patents 1,397,113, 1,579,326, 1,642,871 are suitable. The acid pretreatment, of course, may be less severe than is required for activation, and may be sufficient only to open pores in the clay, allowing easy access of the gas or vapor.

The untreated clay or the above described acid treated clay or a commercially obtainable acid-treated clay in dry finely divided form, or after being formed into aggregate masses as for instance by granulating, molding, extruding or the like (as is practiced in forming clay catalysts) is subjected to the gas or vapor treatment at a temperature preferably in the range of from about 1200° F., up to about the temperature which would result in rapid shrinkage or substantial incipient fusion of the clay. Since clays will vary in composition and properties including fusion temperature even when obtained from the same source, exact temperature ranges cannot be set out. It has been observed that with montmorillonite types of clay the maximum temperature may be as high as 1500° and at times 1550° F., whereas in the case of kaolin clays, even higher temperatures may be employed as above 1600° to 1650° F.

The quantity of gas or vapor employed should be at least sufficient to chemically combine with the quantity of iron present in the clay but is advantageously employed in excess.

As above indicated, the vapor or gas employed is one which reacts chemically with the iron components initially present in the clay or remaining therein after the preliminary acid treatment, if practiced, including that portion of the iron intimately associated in the lattice structure or otherwise in so-called "isomorphous" form. The reagents employed, moreover, act selectively on the iron content without affecting substantial quantities of the aluminum or silicon components of the product, as to an extent which would impair the activity of the clay product as a catalyst. Where the gaseous treating agent converts the iron components of the clay to compounds vaporizable at the treating temperature no further treatment to remove the iron would be required. This would be the case for instance in a treatment with chlorine gas at 1200° to 1400° F. wherein the iron would be vaporized in the form of ferric chloride. In other instances, however, such as where the chlorine treatment is at lower temperatures or the reactive gas or vapor does not form volatile compounds, the iron compounds are nevertheless converted by the treatment to a more available and more readily removable form, such as iron salts, which can then be removed from the treated clay by washing with water or a solvent for the iron salts, or by treatment with a dilute acid, with or without alternate water washing. For example, the clay may be treated with $H_2S$ at 1400° F. and then washed with dilute hydrochloric acid. Instead of leaching out the converted iron compounds, formed by the gas or vapor treatment, they may alternatively be removed by further treatment with another gas or vapor such as chlorine to volatilize the same. Even in instances where subsequent acid leaching is not required to remove iron, it has been found nevertheless advantageous to treat the clay with acid subsequent to the gas or vapor treatment, since more active catalysts are usually obtained in this manner.

The invention includes in addition to the preferred types of gaseous treating agents already named, other gases or vapors capable of converting iron components of the clay to simpler or more available form, such as phosgene, carbon disulfide, sulfurmonochloride, sulfonyl chloride, and sulfur vapors. As will be readily understood the more active gases or vapors will require lower temperatures than less reactive reagents for comparable severity of treatment. For example a treatment with $CS_2$ may require temperatures in the order 1300° to 1400° F. to obtain effects comparable with $H_2S$ at 1200° F.

When the clay to be treated contains components or impurities reactive to form gases or vapors of the type described, the treating reagent may be accordingly selected to react with the said component or impurities initially to form such gases or vapors in situ. For instance, if the clay contains sulfate ions or compounds, as it would if left in unwashed state after sulfuric acid treatment, the product may be then treated with hydrogen gas at the stated temperatures, forming hydrogen sulfide by the reaction with the sulfate, and in that manner accomplishing the effect of an $H_2S$ treatment. Since commercial acid activated clays such as bentonites contain residual sulfate, treatment with $H_2$ gas will be found convenient. Of course, if the residual $SO_4$ is insufficient to supply the required quantity of $H_2S$, additional sulfate may be added to the clay as by further treatment with sulfuric acid or a suitable sulfate.

Although in certain known processes of hydrocarbon conversion the catalyst can be employed in the form of finely divided particles or powders suspended in the charge stock, in other procedures as in fixed or moving catalyst bed operation, the catalyst is preferably employed in the form of larger aggregates or agglomerated masses such as pellets, tablets, course granules, or the like. In the latter case, the large aggregates may be formed at any stage in the production of the final catalyst, but preferably immediately subsequent to the preliminary acid treatment, if practiced. These larger masses may be formed by compressing the dry finely divided particles or powders in a pelleting machine or by previously wetting the dry, treated or untreated clay with water or other inert liquid that will bind the small particles or powder into a cake which, after drying, can be broken up into granules or fragments of desired sizes, or the wet mix can be formed into more regular shapes by molding including casting, extruding or the like. Where the described high temperature gas or vapor treatment is carried out on powder or fine particles, the cohesive properties of the clay may be affected, in which case it may be necessary to add a suitable binder or lubricant to assist in the forming operation, care being taken in selecting such ingredient and maintaining the addition at a minimum so as not to interfere with the catalytic activity of the formed mass, as for instance one can use a raw or acid activated clay of good cohesive properties as a binder for the treated clay. It is preferred, however, to carry out the described gas or vapor treatment of the clay while in the form of granules, tablets, pellets or other agglomerate masses particularly if the final catalyst is to take the form of such larger aggregates. If the catalyst is to be employed in the hydrocarbon treating process in the form of fine particles or powders, formation of larger aggregates for the iron removal treatment is not necessary, but, if desired, larger masses can be formed and treated in accordance with the above-described procedure and subsequently ground or comminuted to the required fineness.

Although the clay catalyst prepared by the preferred procedure has already been subjected to a high temperature treatment, it is still preferred as a final step in the preparation of the catalyst, for use in hydrocarbon conversion process, to subject the same to calcination at temperature above 800° F. in air with or without added steam or in steam alone.

As the iron content of the clay is reduced as herein described the catalyst prepared therefrom is progressively improved in properties and the important advantages indicated above become emphasized by the structural modifications which are thought to take place coincidentally with or as a result of the freeing of the isomorphous iron. The various steps of the process, however, should be controlled to minimize accompanying removal of alumina, particularly in clays having a comparatively low original content of alumina. Marked improvement in catalytic properties of the clay catalysts with progressive iron removal appears generally when the content of iron calculated at $Fe_2O_3$ by weight on clay (dry basis) is reduced to about 0.4% $Fe_2O_3$, although catalysts of still lower iron content are preferred as those having less than about 0.3% Fe₂O₃ and for corrosive stocks particularly, best results are obtained with catalysts having a content of iron compounds corresponding to less than 0.2% Fe₂O₃.

When the contact masses of the present invention are employed in catalytic conversion of hydrocarbons no change in conditions of treatment of the hydrocarbon to be processed is rendered necessary. The usual conditions as to time, temperature, etc. can be followed if desired. As an example of a fixed bed operation, cracking may be carried out at a temperature of 800° to 900° F., employing a space rate (volume of charge, liquid basis, per volume of catalyst per hour) of about 1.5, and a pressure of about 15 pounds per square inch gauge. The temperature, of course, may be varied within the range of about 700° F. to 1100° F., the space rate within the range of about 0.5 to about 3, and pressures may be employed from about atmospheric or slightly lower up to about 100 pounds per square inch, or even higher. Under these conditions the operating period "on stream" may range from five to sixty minutes, for example 10 to 30 minutes alternating with regeneration periods.

In processes other than the fixed bed, such as where the catalyst moves through the reaction zone, the conditions employed may be such, as to subject the oil to substantially equivalent conditions including contact time and ratios of oil to catalyst as those set out above in connection with the fixed bed process. The catalyst during its cycle is passed through a separate regeneration zone.

Reforming may be carried out in accordance with the invention by charging a virgin or cracked gasoline or naphtha fraction under conditions similar to those employed in cracking. In all of these processes, the catalyst after use is regenerated by contacting it with air or other oxygen-containing gas to burn off carbonaceous deposits.

In the following examples notations of catalytic activity are expressed in terms of the standard test (CAT-A method) described in "Laboratory method for determining the activity of cracking catalysts" by J. Alexander and H. G. Shimp, page R537, National Petroleum News, August 2, 1944.

In accordance with the method, a light gas oil is contacted with the catalyst under fixed cracking conditions and the activity of the catalyst is designated in terms of volume per cent of obtained gasoline; the weight per cent of wet gas, specific gravity of the gas, and weight per cent of carbonaceous deposit are also determined.

*Example I*

Pellets of commercial acid activated montmorillonite ("Filtrol") were treated with an excess of H₂S at 1400° F. for two hours under air-free conditions, the apparatus and contents having been previously swept with nitrogen. The pellets turned black as a result of the treatment. An equal volume of 15% HCl was added to the treated pellets after cooling and let stand at room temperature for two hours with frequent shaking. The temperature rose initially with rapid H₂S evolution and the color of the pellets noticeably faded. The acid mixture was then heated for 30 minutes on a steam bath, the temperature rising to 140° F. After decanting, fresh 15% HCl was added to the batch in equal volume and let stand for 22.5 hours, then drained and washed several times with distilled water on a filter until chloride free. The total acid employed was about 35% on clay weight. After drying in an oven at 200° F. the pellets were calcined in air at 1050° F. for two hours. The pellets were now whiter in color than the original pellets.

The X-ray diffraction patterns of the catalyst taken after calcination at temperature intervals from 1050° to 1650° F. indicate that the modified product prepared by the invention is generally less crystalline than the original acid activated clay. A comparison of the X-ray spectra of the two materials at several temperature levels in the designated range reveals variations in line patterns indicative of differences in atomic arrangement. The sample of the catalyst which had not received the gas treatment shows only progressive dimming of certain lines and other individual variations at 50° intervals in temperature, with an apparent transformation in crystalline structure between 1550° and 1600° F., and no amorphous condition over the range of temperatures studied. The gas-treated catalyst, on the other hand, approaches a form amorphous to the X-ray at 1550° F. and is completely so amorphous at 1600° F., at 1650° F. there is the appearance of a new crystalline pattern indicative of a radical transformation in structure. Tested for cracking activity on a light gas oil there was produced 37.3% by volume of gasoline with 2.6% by weight of coke and 4.9% by weight of gas with the catalyst of the example.

Since commercial acid activated montmorillonite clay is a successful catalyst in prominent commercial use in petroleum cracking, it was selected for comparison at various activity levels with the iron-freed catalyst of Example I. The tests were made under standard CAT-A method conditions on a light East Texas gas oil with the following results:

| Catalyst | Calcination | Yield | | | |
|---|---|---|---|---|---|
| | | Gasoline | Coke | Gas | Grav. |
| Commercial acid activated clay (Fe₂O₃=2.0%) | 1400° F.—10 hrs. 5% steam | 34.8 | 2.5 | 4.3 | 1.33 |
| | 1350° F.—4 hrs. 100% steam | 29.4 | 2.0 | 3.1 | 1.26 |
| Catalyst of Example I (Fe₂O₃=0.1%) | 1400° F.—10 hrs. 5% steam | 33.0 | 1.5 | 3.0 | 1.41 |
| | 1350° F.—4 hrs. 100% steam | 27.2 | 1.0 | 2.3 | 1.37 |

The marked reduction in coke (40–50% lower) and gas produced by the new low iron catalyst with about the same gasoline yields is of even greater significance as indicative of the catalyst behaviour in connection with high coke producing charge stocks, such as heavy petroleum oils. This was borne out in actual operation cracking a heavy East Texas crude oil fraction (27.6 API) wherein compared with typical commercial clay catalyst, the iron-freed catalyst yielded an increase in gasoline of over 10% of the gasoline recovery, with deposition of 10% less coke, and with about the same total liquid recovery.

Chemical analyses of the starting commercial acid activated montmorillonite clay and the modified low iron catalyst produced therefrom are shown below (calculated to an ignited basis):

|  | Commercial acid activated montmorillonite, Parts by Wt. | Example I | |
|---|---|---|---|
|  |  | SiO$_2$ constant | Actual basis |
| SiO$_2$ | 73.9 | 73.9 | 76.7 |
| Al$_2$O$_3$ | 18.0 | 17.5 | 18.2 |
| Fe$_2$O$_3$ | 2.1 | .09 | 0.1 |
| CaO | 3.1 | .96 | 1.0 |
| MgO | 4.9 | 4.24 | 4.4 |

It will be noted that although the iron and calcium compounds have been substantially diminished, the content of alumina and magnesium compounds remains comparatively unaffected. The above analysis is exemplary of preferred types of acid-activated montmorillonite clays modified in accordance with the present invention, comprising in the preferred range about 93–97% of silica and alumina (in the weight ratio of about 3½:1 to 5:1), the remaining 7–3% of the modified clay containing magnesium compound as major component, the magnesium being present preferably in excess of calcium as to the extent of about three to four or more times that of the calcium and other minor compounds or it may generally comprise at least 75% of the ingredients other than silica and alumina, with iron below about 0.2%

The characteristic temperature stability of catalysts of the present invention is significantly shown by the comparatively small change in pellet density and porosity after heat treatment at 1600° F. Whereas a typical commercial clay catalyst over the temperature range of 1500–1600° F. lost 50% of its porosity (measured in volume percent) the catalyst of Example I showed no significant shrinkage and less than 15% loss in porosity. Although with other active clays of the bentonite types losses in porosity of 50% or more may be encountered under these conditions, the modified clays of the invention showed a relatively small loss in porosity. The preferred modified clays of the montmorillonite class in accordance with the invention are those which lose less than 20% difference in porosity between such clays heated for two hours at 1500° F. and heated for the same period at 1600° F. The volume percent porosity in the following table was obtained by measuring the volume of water absorbed by a pellet of measured volume, substantially in accordance with the standard A. S. T. M. method (D468–42; method A—water absorption). The catalytic activity was well retained after being subjected to the last stated high temperature, which temperature caused rapid decline in activity of a commercial catalyst from the same source clay. The results are shown by the following tabulation:

|  | Heat Treating Catalyst Temperature, °F. | | | | | | | | Activity after 1600° F. | | |
|---|---|---|---|---|---|---|---|---|---|---|---|
|  | 1400 | | 1500 | | 1550 | | 1600 | | Gasoline, Vol. percent | Coke, Wt. percent | Gas, Wt. percent |
|  | p. d. | v. p. | p. d. | v. p. | p. d. | v. p. | p. d. | v. p. |  |  |  |
| Commercial acid activated clay | 1.08 | ------ | 1.12 | 53.6 | 1.4 | 35.8 | 1.59 | 26.8 | 11.2 | 0.4 | 1.2 |
| Catalyst of Example I | 1.01 | ------ | 1.02 | 58 | 1.05 | 55.0 | 1.14 | 50.0 | 35.3 | 1.4 | 4.1 | p. d.=pellet density; v. p.=volume percent porosity.

The characteristic resistance of the new catalysts to sulfur and sulfides at high temperature is demonstrated by a comparison of the same with typical clay catalyst of about the same initial activity level (39).

|  | Activity after sulfidation | | | |
|---|---|---|---|---|
|  | Gasoline, Vol. percent | Coke, Wt. percent | Gas, Wt. percent | Gas Grav. |
| (a) Commercial acid activated clay (2.0% Fe$_2$O$_3$) | 22.2 | 8.0 | 8.9 | 0.58 |
| (b) Above clay after treatment (0.12% Fe$_2$O$_3$) | 38.7 | 2.5 | 7.9 | 1.55 |

The catalyst in (a) above was a typical commercial acid-activated clay while (b) was obtained by treating the same clay in accordance with Example I. The above sulfidation tests were made with H$_2$S at 1000° F. for 2 hours. The results are indicative of the respective stability of the two catalysts and their behaviour when employed for cracking or reforming of sulfur bearing charge stocks (compare Example V).

*Example II*

The tendency towards improved gasoline/gas and gasoline/coke ratios is in many instances evident when the iron content of the clay has been reduced to the order of about .8% Fe$_2$O$_3$. For example, the commercial acid activated montmorillonite treated as in Example I except that the H$_2$S treatment was carried out at 1100° F. gave a catalyst which compared favorably with the original clay catalyst, as shown by the following tabulation:

|  | Percent Fe$_2$O$_3$ | Vol. percent Gasoline | Wt. percent Coke | Wt. percent Gas | Grav. Gas |
|---|---|---|---|---|---|
| Original acid-activated clay catalyst | 2.0 | 39.9 | 3.4 | 5.9 | 1.40 |
| Example II | .77 | 39.9 | 2.7 | 5.2 | 1.49 |

Example III

An unwashed commercial acid activated subbentonite clay in pellet form ($SO_4$=4.3%) was treated with hydrogen gas for two hours at 1400° F. in an apparatus freed from air. The product which turned greyish-black in color, was then leached with hydrochloric acid of 5% strength until all the dark color was removed, followed by washing and drying. On analysis it was found that the original iron content of over 2% $Fe_2O_3$ had been reduced to .34% $Fe_2O_3$. The dried clay was then calcined in air at 1050° F. for 2 hours and employed in cracking of a light gas oil under above designated standard test conditions. There was obtained a yield of 32.9% by volume gasoline with the production of 1.9% by weight of coke and 5.6% by weight of gas of 1.34 gas gravity.

Example IV

A montmorillonite clay from Pontotoc, Mississippi ($Fe_2O_3$=5.38%) was treated with sulfuric acid of 15% strength at room temperature over a period of eight hours employing an amount of acid (100% basis) equal to 60% of the dried clay. After washing and drying the product was formed into pellets of about 4 mm. cross-section.

(a) One portion of the pellets was calcined for 2 hours in air at 1050° F. Analysis of the product gave 2.88% $Fe_2O_3$.

(b) Another portion of the pellets was treated with $H_2S$ at 1400° F. for 2 hours. After cooling the pellets were leached with hydrochloric acid of 15% strength at room temperature for 24 hours, washed with water, dried and calcined in air at 1050° F. Analysis of the product gave 0.11% $Fe_2O_3$.

The activity of the catalysts produced in accordance with (a) and (b) above is compared in Example VI.

Example V

The following example illustrates the striking degree of stability of the iron-freed clay catalysts towards high sulfur stock. The catalyst of Example I was employed in cracking Santa Maria gas oil, a highly corrosive stock of high sulfur content, under the following operating conditions: charging 1.5 volumes of oil per volume of catalyst per hour at a temperature of about 800° F., at atmospheric pressure, operating for 10 minutes with alternate regeneration. The following tabulation indicates the results obtained compared with commercial acid-activated clay catalyst used under the same conditions, the activity tests being on light East Texas gas oil.

|  | Acid activated clay ($Fe_2O_3$=2%) | | | Catalyst of Ex. I ($Fe_2O_3$=.1%) | | |
| --- | --- | --- | --- | --- | --- | --- |
|  | Gasoline | Coke | Gas | Gasoline | Coke | Gas |
| Activity test on Fresh Catalyst (CAT-A) | 34.8 | 2.5 | 4.3 | 33.0 | 1.5 | 3.0 |
| Santa Maria Gas Oil: | | | | | | |
| 1st run | 32 | 10.8 | 5.5 | 28 | 6.5 | 3.3 |
| 4th run | 27 | 11.7 | 7.0 | 30 | 6.5 | 2.9 |
| 8th run | 24 | 13.7 | 6.6 | 30 | 6.4 | 3.1 |
| CAT-A Activity Test after Santa Maria Gas Oil Cracking | 18.3 | 4.9 | 5.8 | 35.0 | 1.8 | 3.5 |

Example VI

Other typical examples of increase in gasoline yields as well as lowered coke after removal of iron by the described methods are illustrated by the following comparisons:

|  | Gasoline | Coke | Gas |
| --- | --- | --- | --- |
| Commercial acid activated Milwhite clay (a Texas montmorillonite) $Fe_2O_3$=5.1 | 42.4 | 6.4 | 12.1 |
| Above clay modified $Fe_2O_3$=.15% | 44.0 | 4.5 | 9.7 |
| Bentonite clay from Pontotoc, Miss. activated with $H_2SO_4$ (Example IVa) $Fe_2O_3$=2.88% | 34.1 | 4.1 | 7.3 |
| Above clay modified (Example IVb) $Fe_2O_3$=.11% | 41.4 | 3.4 | 8.9 |

Obviously many modifications and variations of the invention as hereinbefore set forth may be made without departing from the spirit and scope thereof and therefore only such limitations should be imposed as are indicated in the appended claims.

Various aspects of the described invention are particularly claimed in our copending applications Serial Nos. 644,423 and 644,424 both filed of even date with the present application, and in our continuation-in-part application Serial No. 681,426 filed July 3, 1946. Hydrocarbon conversion processes employing catalytic contact masses of the present invention are particularly claimed in our copending application No. 644,425 filed simultaneously with the present application.

We claim as our invention:

1. The method of preparing catalytic contact masses from acid-activated montmorillonite clay, which comprises the steps of subjecting the said acid-activated clay to treatment with a gas reactive with iron to form acid soluble iron compounds, at a temperature of not less than 1200° F. but insufficient to effect substantial incipient fusion of the clay and for a period of time sufficient to convert iron and iron compounds present therein to acid soluble form, and removing the so formed acid-soluble iron reaction products by leaching with dilute mineral acid.

2. The method of preparing catalytic contact masses from acid-activated montmorillonite clay which comprises, forming said clay into integral unit masses of desired size, treating the units so formed at a temperature of at least 1200° F. and insufficient to effect substantial incipient fusion of the clay, with a chemical reagent in gaseous form reactive to form acid soluble iron compounds with the iron components of the clay, and removing the formed iron compounds by acid leaching.

3. The method of modifying a montmorillonite-containing clay containing iron compounds which comprises treating such a clay with acid to an extent at least sufficient to improve the porosity thereof, contacting the treated clay at a temperature in excess of 1200° F. and insufficient to effect substantial incipient fusion of the clay, with a chemical reagent in gaseous form reactive with the iron components of the clay to form acid soluble iron salts, and leaching out the iron salts so formed.

4. The method of preparing catalytic contact masses which comprises treating montmorillonite-containing clay with acid to an extent at least sufficient to improve the porosity thereof, forming the treated product into aggregate masses, treating said masses at a temperature in excess of 1200° F. and insufficient to effect substantial incipient fusion of the clay, with a chemical reagent which is gaseous at that temperature and which is reactive with iron compounds to form iron salts, leaching the clay masses with acid without substantial disintegration thereof and calcining the said masses.

5. The method of preparing catalytic contact masses which comprises treating pre-formed pieces of iron-containing montmorillonite clay with a chemically reactive gas at a temperature in the range of 1200° F. to 1550° F. to form acid soluble iron salts in situ, removing the salts so formed by leaching with acid at room temperature, and calcining the pieces.

6. The method which comprises subjecting acid-activated montmorillonite clay to contact at high temperature in the range of about 1200° to 1550° F., with a gas reacting with the isomorphous iron present in the clay to form soluble iron reaction products, dissolving out the formed iron reaction products, and calcining the clay residue.

7. The method of preparing clay catalysts of low iron content which comprises the steps of acid treating raw montmorillonite clay to an extent at least sufficient to improve the porosity thereof, treating the clay at a temperature in the range of about 1200° F. to 1550° F. with a reactive gas to transform substantially all of the iron present therein to acid soluble iron salts, leaching out the said salts with acid, washing, drying and calcining the residue.

8. The method of preparing catalysts from montmorillonite clay containing iron compounds which comprises, treating the clay at a temperature in the range of 1200-1500° F. with a chemical reagent gaseous at the treating temperature, said reagent forming acid-soluble iron salts by reaction with the iron components of the clay, removing the iron salts so formed by acid washing the clay at substantially room temperature, and calcining the obtained clay residue at a temperature in excess of 800° F.

9. The method which comprises subjecting an acid activated montmorillonite clay containing residual sulfates to contact with hydrogen at 1200°–1550° F., and acid leaching the treated clay product, the residual sulfate content of the clay subjected to said treatment with hydrogen being sufficient at least to furnish sulfide ion in an amount not substantially less than the stoichiometric equivalent of the $Fe_2O_3$ content of the clay.

10. The method of preparing contact masses of improved stability from acid activable sub-bentonite clays, which comprises subjecting such a clay in finely divided form to treatment with mineral acid under conditions and to an extent sufficient to effect activation thereof, forming the treated product into pellets, treating said pellets at a temperature of at least 1200° F. and insufficient to effect substantial incipient fusion of the clay, with a gas reactive with iron compounds to form acid soluble iron salts, leaching the thus treated pellets with acid at about room temperature without substantial disintegration of the pellets.

HUBERT A. SHABAKER.
GEORGE ALEXANDER MILLS.
RUTH C. DENISON.

REFERENCES CITED

The following references are of record in the file of this patent:

UNITED STATES PATENTS

| Number | Name | Date |
|---|---|---|
| 2,030,867 | Hart | Feb. 18, 1936 |
| 2,322,674 | Thomas | June 22, 1943 |
| 2,391,312 | Ewing et al. | Dec. 18, 1945 |
| 2,388,302 | Weyl | Nov. 6, 1945 |
| 2,395,198 | Schulze | Feb. 19, 1946 |